(12) United States Patent
Morrison et al.

(10) Patent No.: US 11,481,006 B2
(45) Date of Patent: Oct. 25, 2022

(54) INFORMATION HANDLING SYSTEM INFINITY KEYBOARD WITH HIDDEN LATTICE

(71) Applicant: Dell Products L.P., Round Rock, TX (US)

(72) Inventors: Jason S. Morrison, Chadron, NE (US); Brandon J. Brocklesby, Pflugerville, TX (US); Mark A. Schwager, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/143,861

(22) Filed: Jan. 7, 2021

(65) Prior Publication Data

US 2022/0214720 A1 Jul. 7, 2022

(51) Int. Cl.
| | |
|---|---|
| *G06F 3/02* | (2006.01) |
| *H01H 13/88* | (2006.01) |
| *H01H 13/7065* | (2006.01) |
| *H01H 3/12* | (2006.01) |
| *G06F 1/16* | (2006.01) |
| *H01H 13/702* | (2006.01) |
| *H01H 13/705* | (2006.01) |

(52) U.S. Cl.
CPC .......... *G06F 1/1662* (2013.01); *G06F 1/1664* (2013.01); *G06F 3/0202* (2013.01); *G06F 3/0216* (2013.01); *G06F 3/0224* (2013.01); *H01H 3/125* (2013.01); *H01H 13/702* (2013.01); *H01H 13/705* (2013.01); *H01H 13/7065* (2013.01); *H01H 13/88* (2013.01)

(58) Field of Classification Search
CPC .... G06F 3/0202; G06F 3/0216; G06F 1/1662; G06F 1/1664; G06F 1/166; G06F 3/0414; G06F 3/02; G06F 3/016; G06F 3/0227; G06F 3/0224; G06F 3/0412; G06F 3/0416; G06F 1/1669; G06F 1/1671; H01H 13/705; H01H 13/7065; H01H 13/702; H01H 13/88; H01H 3/125; H01H 2239/074; H01H 2223/003; H01H 13/704; H01H 13/807; H01H 13/85; H01H 13/70; H01H 13/7057; H01H 2203/058; H01H 2227/032; H01H 2205/006; H03K 17/9622; H03K 17/98
See application file for complete search history.

(56) References Cited

U.S. PATENT DOCUMENTS

| | | | |
|---|---|---|---|
| 8,592,699 B2 | 11/2013 | Kessler et al. | |
| 8,822,858 B2 | 9/2014 | Niu et al. | |
| 9,665,181 B2* | 5/2017 | Morrison | H01H 13/83 |
| 9,852,854 B1* | 12/2017 | Wang | H01H 13/06 |
| 10,083,805 B2 | 9/2018 | Knopf et al. | |
| 10,126,783 B2 | 11/2018 | Farahani et al. | |
| 10,133,360 B2* | 11/2018 | Morrison | G06F 1/1618 |

(Continued)

*Primary Examiner* — Dismery Mercedes
(74) *Attorney, Agent, or Firm* — Zagorin Cave LLP; Robert W. Holland

(57) ABSTRACT

A portable information handling system keyboard having infinity keys with a beveled bottom surface perimeter is provided enhanced rigidity with a hidden lattice have support lines of raised material, such as stainless steel, aligned below the beveled bottom surface perimeter of the keys. The lattice provides structural support while remaining substantially hidden from the upper key surface of an infinity keyboard.

15 Claims, 5 Drawing Sheets

(56) References Cited

U.S. PATENT DOCUMENTS

| | | | |
|---|---|---|---|
| 11,087,937 B2* | 8/2021 | Wang | G06F 3/041 |
| 11,126,272 B2* | 9/2021 | Li | G06F 3/0216 |
| 2011/0284355 A1* | 11/2011 | Yang | H01H 13/702 |
| | | | 200/5 A |
| 2012/0299832 A1* | 11/2012 | Peterson | G06F 3/0202 |
| | | | 345/168 |
| 2015/0060250 A1* | 3/2015 | Kimura | H01H 13/705 |
| | | | 362/23.03 |
| 2016/0358725 A1* | 12/2016 | Liao | H01H 13/85 |
| 2017/0038855 A1* | 2/2017 | Morrison | G06F 3/0202 |
| 2017/0076880 A1* | 3/2017 | Niu | G06F 3/0202 |
| 2019/0091946 A1* | 3/2019 | Lancaster-Larocque | |
| | | | B29C 70/541 |
| 2019/0244772 A1* | 8/2019 | Wang | G06F 1/1662 |
| 2020/0278747 A1 | 9/2020 | Ligtenberg et al. | |
| 2020/0333887 A1* | 10/2020 | Li | G06F 3/0224 |

* cited by examiner

INFORMATION HANDLING SYSTEM INFINITY KEYBOARD WITH HIDDEN LATTICE

BACKGROUND OF THE INVENTION

Field of the Invention

The present invention relates in general to the field of portable information handling system input devices, and more particularly to an information handling system infinity keyboard with hidden lattice.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs at an integrated keyboard while viewing the display. After usage, convertible information handling systems rotate the lid housing portion over the main housing portion to protect the keyboard and display, thus reducing the system footprint for improved storage and mobility.

One goal of portable information handling system manufacturers is to design and manufacture portable systems that have a minimal footprint and weight, yet have robust structural soundness to survive stresses typical to mobile use. Generally, portable information handling system length and width are driven by the size of the display that is integrated in the housing so that reducing the system footprint tends to mean reducing the system Z-height or thickness. One way to reduce housing thickness is by reducing the thickness of a keyboard integrated in the portable housing. For instance, limiting the vertical movement of keys of a keyboard can reduce the keyboard height, although some minimal amount of movement is typically considered necessary to provide the end user with feedback of a key input. One difficulty with thinner keyboards is that the reduced height tends to leave insufficient space for supporting material that provides sufficient structural strength and rigidity to withstand end user inputs. One solution to add rigidity is to insert a lattice over the keyboard having openings through which each key protrudes. For example, a keyboard is placed over top of an upper housing surface and then held in place by a lattice that fits between the keys and couples to the upper housing surface. Both the lattice and upper housing surface provide rigidity against end inputs; however, including the lattice tends to detract from the appearance of the system and decrease the size of the keys relative to the keyboard. One alternative is to place the keys proximate to each other with minimal spacing in a lattice-free "infinity" appearance. In very thin systems, removing the lattice has too great of an impact on structural strength so that additional material may have to be added under the keyboard to provide adequate rigidity, which tends to increase system height.

SUMMARY OF THE INVENTION

Therefore, a need has arisen for a system and method which provides a hidden lattice support for an infinity keyboard integrated in an information handling system.

In accordance with the present invention, a system and method are provided which substantially reduce the disadvantages and problems associated with previous methods and systems for integrating a keyboard in an information handling system. A keyboard having plural keys disposed adjacent to each other couple over a lattice that provides support to the keyboard hidden under beveled bottom surfaces of the keys to be substantially out of view from the keyboard upper surface.

More specifically, a portable information handling system processes information with a processor and memory disposed in a portable housing and accepts inputs through a keyboard integrated in the portable housing. The keyboard has an "infinity" configuration with minimal spacing between adjacent keys, such as to have the area below the keys substantially hidden and not visible from above the keyboard. The keyboard accepts key inputs as presses at each key that are detected by a membrane disposed over a support plate. Each key is formed to have a bottom side perimeter with a bevel so that an open area is defined between adjacent keys and under the key upper surface plane. A lattice couples to the support plate under the keys with lines of material raised under the beveled perimeters so as not to interfere with key presses while adding rigidity to the support plate. In one embodiment, a front side of a front row of keys has an extended front surface instead of a bezel, such as to impede viewing below the keyboard, and the lattice does not extend across the front side of the keyboard so that the front row of keys can press down without interference by lattice raised material. The lattice is, for example, a stainless steel arrangement of lines that form openings corresponding to keyboard key positions and couples to the support plate over the membrane.

The present invention provides a number of important technical advantages. One example of an important technical advantage is that a keyboard integrates into a portable information handling system with an infinity appearance and minimal height while having an enhanced structural integrity provided by a lattice disposed out of view under the keys and aligned to avoid interference with key presses at beveled perimeters at the lower key side. A zero edge front side of the keyboard provides an aesthetically pleasing appearance with the front side of the front row of keys extended down and the lattice stopping under the keyboard without extending to the front edge of the keys. The hidden lattice helps reduce system height while improving keyboard robustness so that, for instance, the keyboard need not rest on an upper housing surface to have adequate structural robustness.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An infinity keyboard has improved rigidity with a hidden lattice disposed below beveled bottom key surfaces to remain substantially out of sight from above the key upper surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
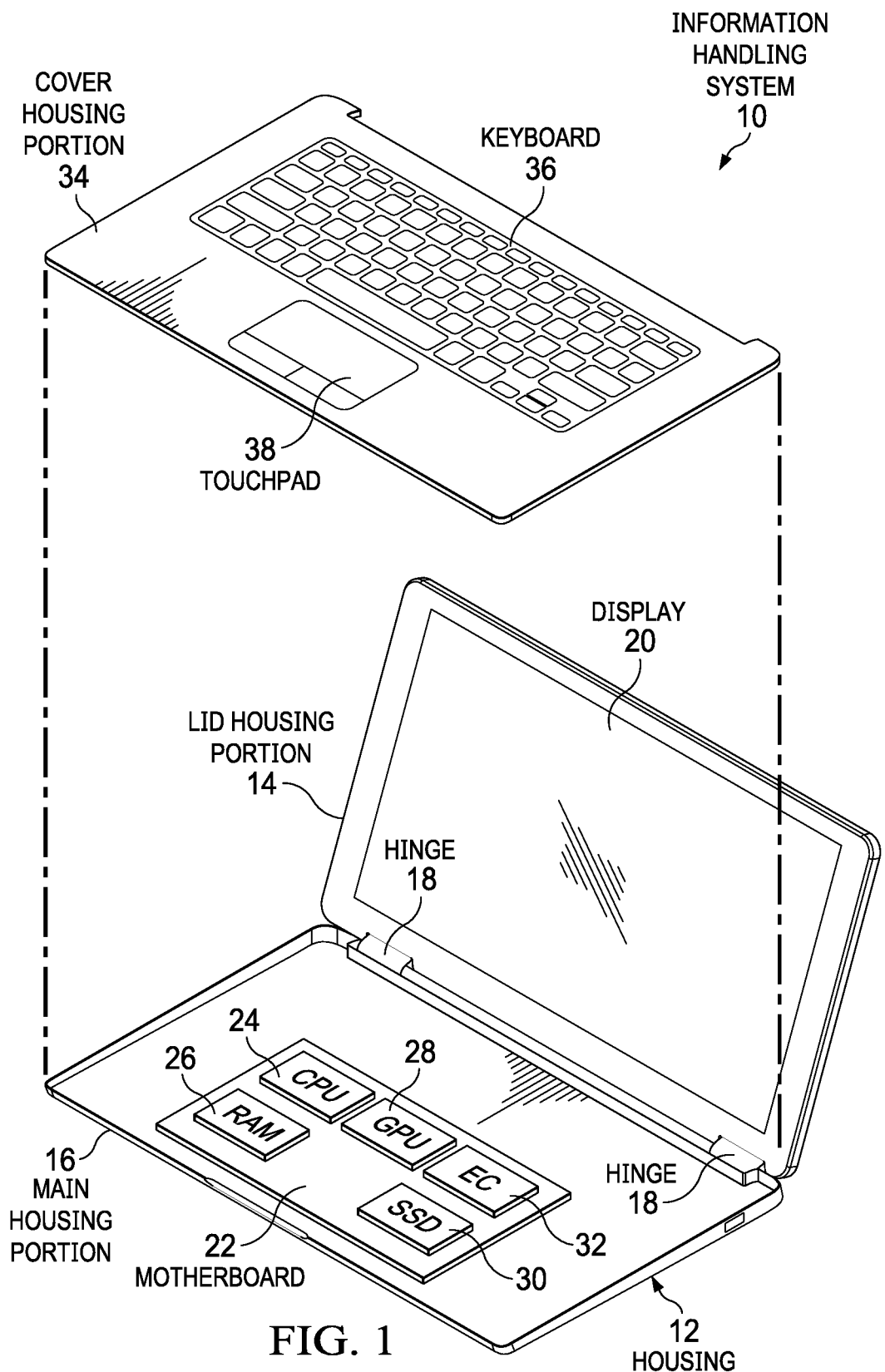
FIG. 1 depicts an exploded perspective view of a portable information handling system having an integrated keyboard.

Referring now to FIG. 1, an exploded perspective view depicts a portable information handling system 10 having an integrated keyboard 36. In the example embodiment, information handling system 10 processes information with processing components disposed in a housing 12 having a lid housing portion 14 rotationally coupled to a main housing portion 16 by a hinge 18. Lid housing portion 14 integrates a display 20 that presents information as visual images. In the depicted clamshell open position, main housing portion 16 holds display 20 is a viewing position with keyboard 36 supported on a cover 34 to accept inputs typed by an end user. A motherboard 22 couples to main housing portion 16 to support communication between processing components that cooperate to process information. For instance, a central processing unit (CPU) 24 executes instructions that process information. A random access memory (RAM) 26 stores the instructions and information. A graphics processing unit (GPU) 28 further processes the information to generate pixel values that define visual images presented at display 20. A solid state drive (SSD) 30 or other persistent storage device stores the instructions and information during power down states of the system, such as an operating system and applications that are retrieved at power up to RAM 26 for execution on CPU 24. An embedded controller 32 manages operation conditions for the processing components, such as power supply and thermals. In addition, embedded controller 32 is a keyboard controller that receives inputs from keyboard 36 for communication to CPU 24.

In the example embodiment, keyboard 36 and a touchpad 38 couple to an upper surface of a cover housing portion 34 that, in turn, couples to main housing portion 16. Keyboard 36 has rigidity to accept typed inputs from an end user over top of cover housing portion 34. In one example embodiment, cover housing portion 34 extends under keyboard 36 to provide support against end user presses. Alternatively, keyboard 36 may fit in an opening of cover housing portion 34 and rely upon its internal structure to provide sufficient rigidity against end user inputs. In such an embodiment, keyboard 36 may include a hidden lattice as described below to supplement the rigidity of keyboard 36 against end user touches. In another alternative embodiment, the hidden lattice may be used to help supplement the rigidity of peripheral keyboards that interface separate from housing 12, such as through a Bluetooth or other wireless interface.

Figure 2:
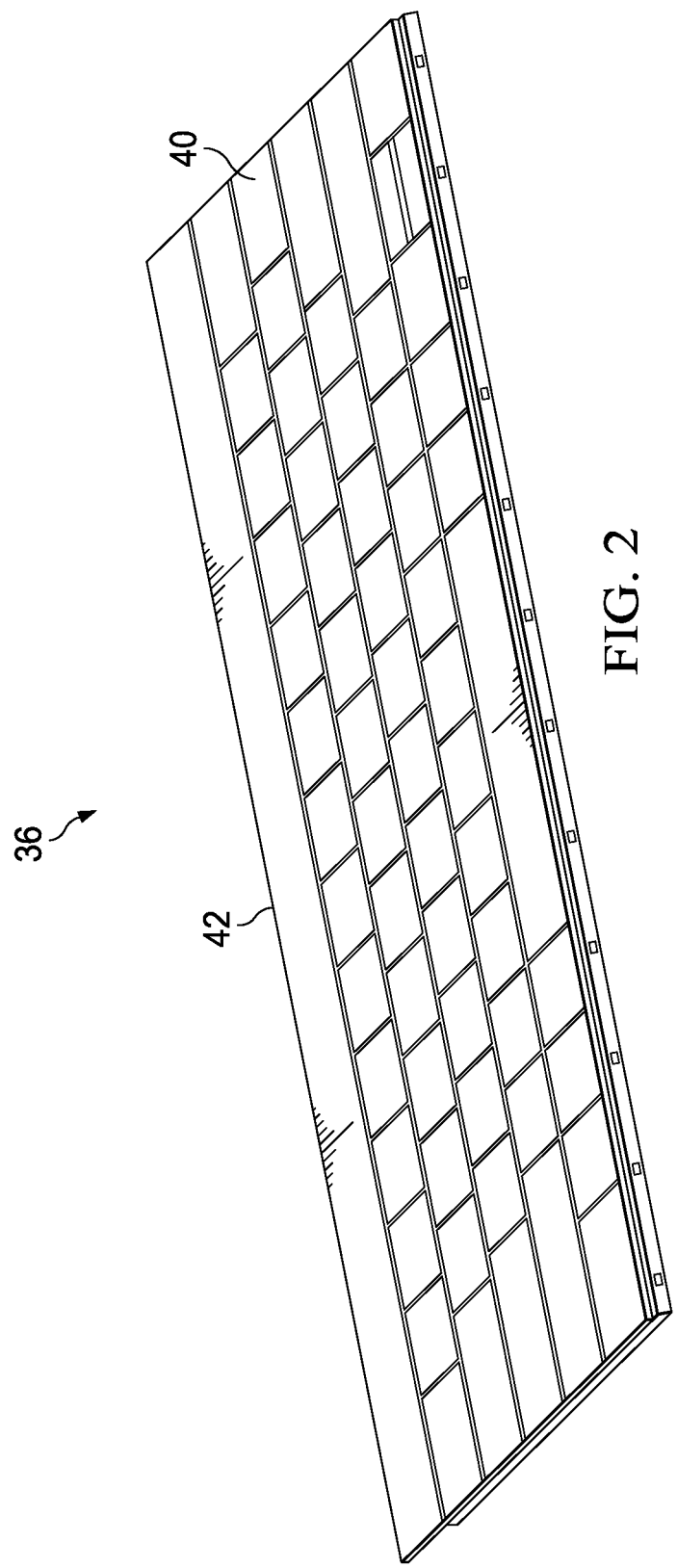
FIG. 2 depicts a side perspective view of an infinity keyboard having a lattice support that is substantially hidden from view above.

Referring now to FIG. 2, a side perspective view depicts an infinity keyboard 36 having a lattice support that is substantially hidden from view above. Keyboard 36 has an interface 42 at a rear side that couples to a housing with some overlap to provide a robust structure and communication of key inputs. A front row of keys 40 align at a housing with a smaller overlap and an extended front surface to provide an aesthetic appearance. Keys 40 have an "infinity" appearance with each key 40 positioned adjacent to proximate keys so that minimal spacing exists between keys 40 and the upper surface of keyboard 36 biases keys in a raised plane having a unitary appearance. Since each key 40 depresses to accept an input independent of proximate keys, some spacing exists between adjacent keys, however, the close proximity of the key perimeters provides a minimal gap so that keyboard 36 below the raised plane of keys 40 is substantially hidden from view above keys 40. That is, some portion of keyboard 36 below keys 40 may be visible, but that visible portion will be minimal and the intent of an infinity keyboard as depicted by FIG. 2 is to present a uniform upper plane with keys 40 in a raised position.

Figure 3:
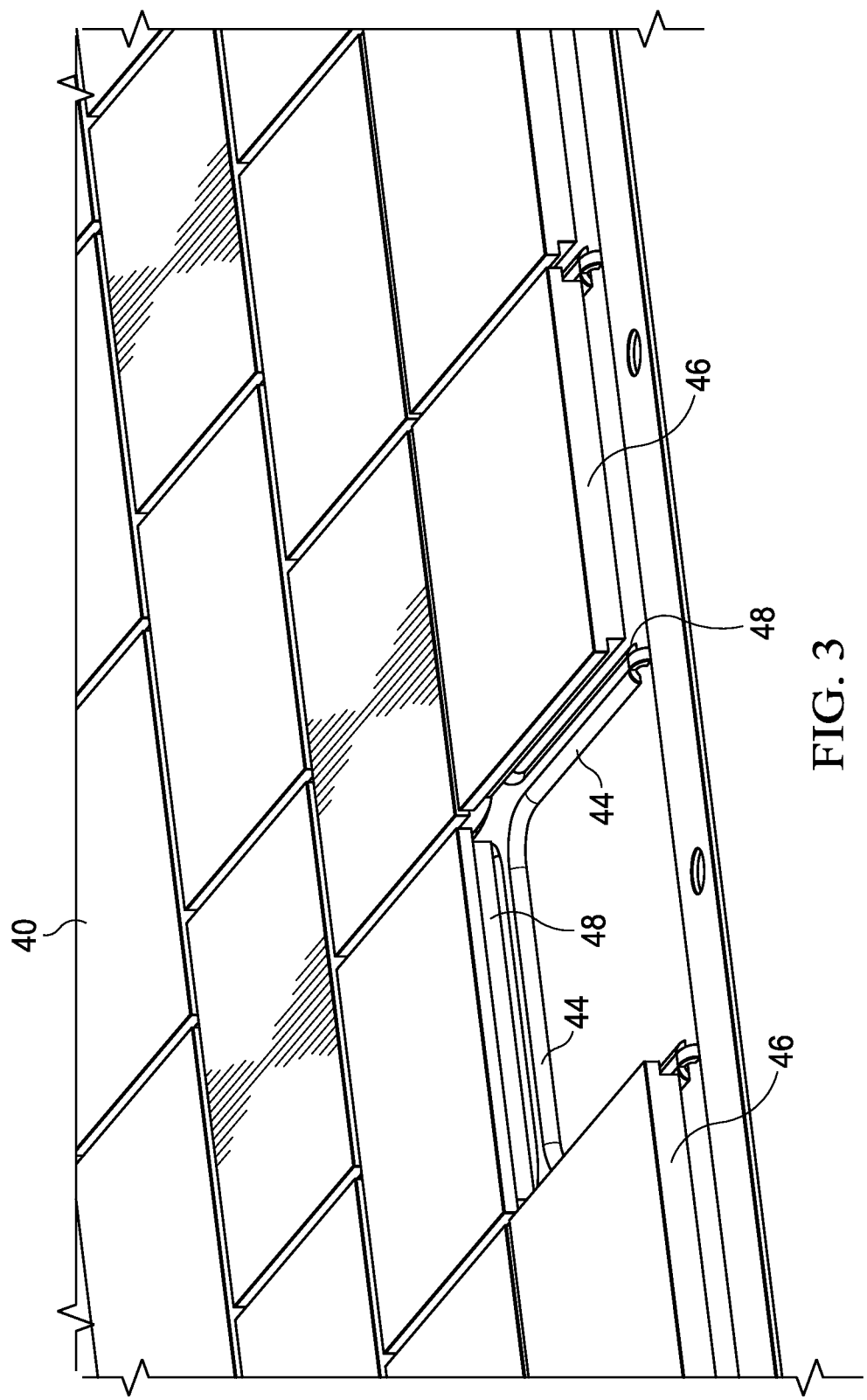
FIG. 3 depicts a side perspective view of the infinity keyboard having a front row key removed to expose a lattice disposed between adjacent keys under the beveled perimeters of the key bottom surface.

Referring now to FIG. 3, a side perspective view depicts the infinity keyboard 36 having a front row key removed to expose a lattice 44 disposed between adjacent keys 40 under the beveled perimeters 48 of the key 40 bottom surface. Lattice 44 is substantially hidden when viewed from above keys 40 as the perimeters of the keys 40 align adjacent to each other with a minimal gap. Lattice 44 is, for example a stainless steel structure of overlapping lines of raised material that defines an opening at the location of each key 40. In alternative embodiments, lattice 44 may be a plastic, ceramic or other type of material selected with a goal of adding stiffness to keyboard 36. The height of lattice 44 and amount of raised material is selected based upon a desired amount of key movement. To provide space for lattice 44, each key 40 has a beveled perimeter 48 around at least those sides of the key that are disposed over lattice 44. Beveled perimeter 48 is formed as a curved lip that conforms to the shape of the raised material of lattice 44 so that a press of a key 40 results in a downward motion to provide an input without impacting the bottom surface of the key against lattice 44. In alternative embodiments, other shapes may be used for the beveled surface and lattice raised material that prevents impact, such as opposing squared shapes or opposing triangular shapes.

In the example embodiment, keys 40 in a front row of keyboard 36 have an extended front surface 46 at the front side of the bottom perimeter to provide an infinity appearance where the front row of keys are exposed. Lattice 44 terminates at the front of keyboard 36 so that no raised material is disposed under extended front surface 46 of the front row of keys 40. The other three sides of the bottom surface of keys 40 in the front row have beveled perimeter 48 to provide spacing for vertical movement of keys 40 relative to the raised material of lattice 44. Keys 40 located in the interior of keyboard 36 have all four sides of the bottom surface formed with beveled perimeter 48. In one alternative embodiment, a rear row of keys 40 may also have the extended surface where the rear side is exposed to an end user view. In another alternative embodiment having the front face of keyboard 36 seated within a housing and not visible to an end user, the front row of keys may have beveled perimeter 48 at all four sides.

Figure 4:
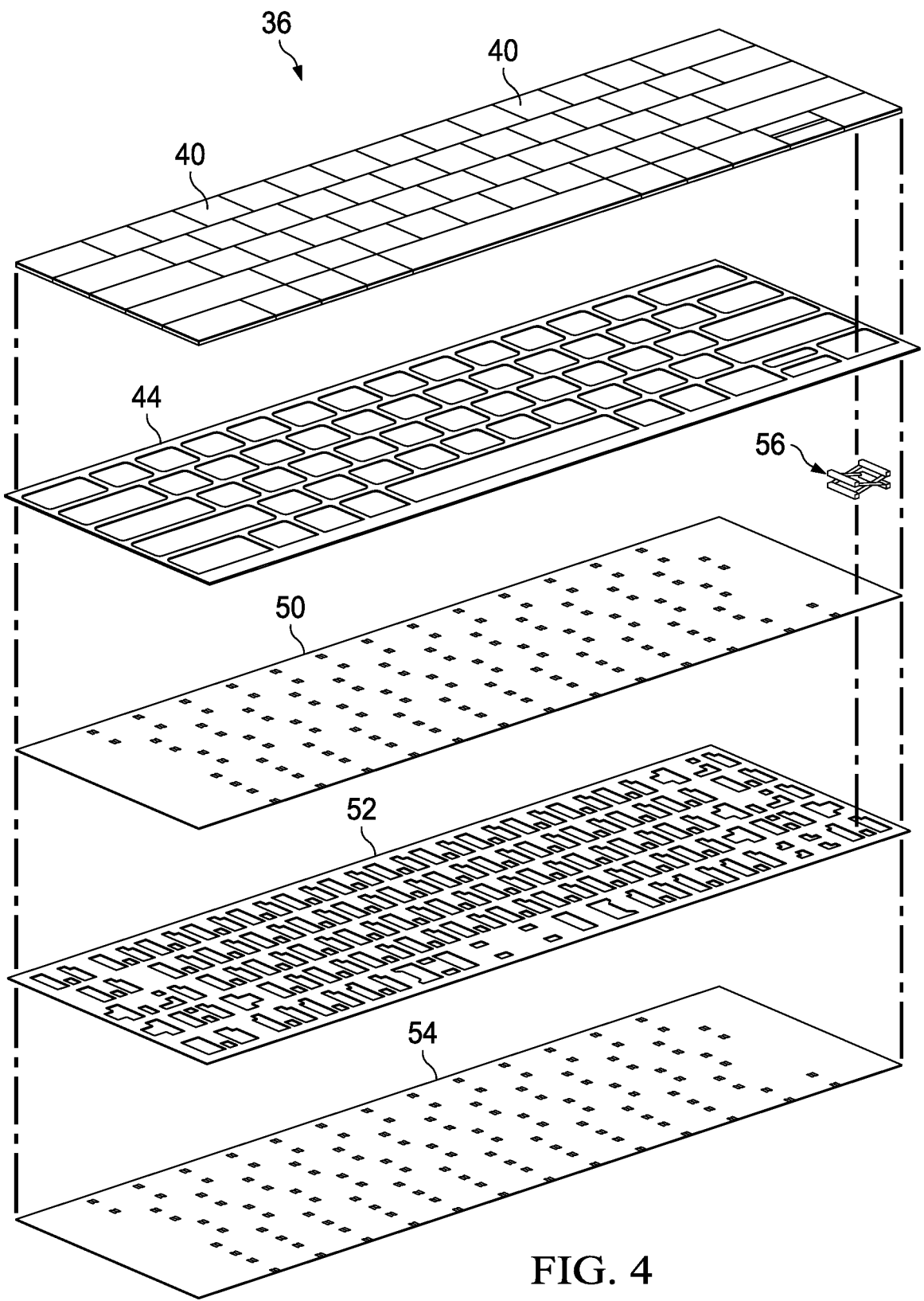
FIG. 4 depicts a side perspective exploded view of an infinity keyboard having a lattice disposed in a hidden configuration to provide structural support.

Referring now to FIG. 4, a side perspective exploded view depicts an infinity keyboard 36 having a lattice 44 disposed in a hidden configuration to provide structural support. An upper layer of keys 40 having an infinity configuration accepts end user inputs as presses with each individual key depressing from a raised plane to an input plane that touches the key 40 against a membrane 50, which detects the touch. A scissors 56 or other biasing mechanism, such as a rubber dome or magnet arrangement, biases each key 40 upwards to the elevated plane. A support plate 52 disposed below membrane 50 provides support for membrane 50 so that presses of a key 40 have sufficient force to generate an input at membrane 50. In the example, support plate 52 has an opening aligned with each key to allow flexing of membrane 50 at the opening on an input. In addition, support plate 50 provides coupling locations to which scissors 56 or other biasing mechanisms couple. Below support plate 52, a light guide plate 54 distributes illumination to backlight keys 40.

In the example embodiment, lattice 44 has lines of perpendicular material configured to define openings that match the position of keys 40. This provides raised material of lattice 44 between each adjacent key 40 so that material stiffness of keyboard 36 is enhanced without compromising key 40 downward movement, such as by aligning lattice 44 raised material under beveled perimeters formed at the bottom of each key 40. In alternative embodiments, alternative arrangements of raised material may be used to enhance keyboard 36 stiffness at desired locations. For instance, keys 40 may have lips or indented portions at other locations than the key bottom surface perimeter that will support a downward key press without interference by lattice 44 raised material. In another alternative embodiment, lattice 44 may have openings that fit plural keys 40 rather than a single key for each lattice opening as depicted in the example embodiment. In the example embodiment, lattice 44 has plural lines of raised material having a consistent height, however, in alternative embodiments the amount of lattice raised material may vary to adapt to a desired stiffness at different keyboard locations while minimizing weight.

Figure 5:
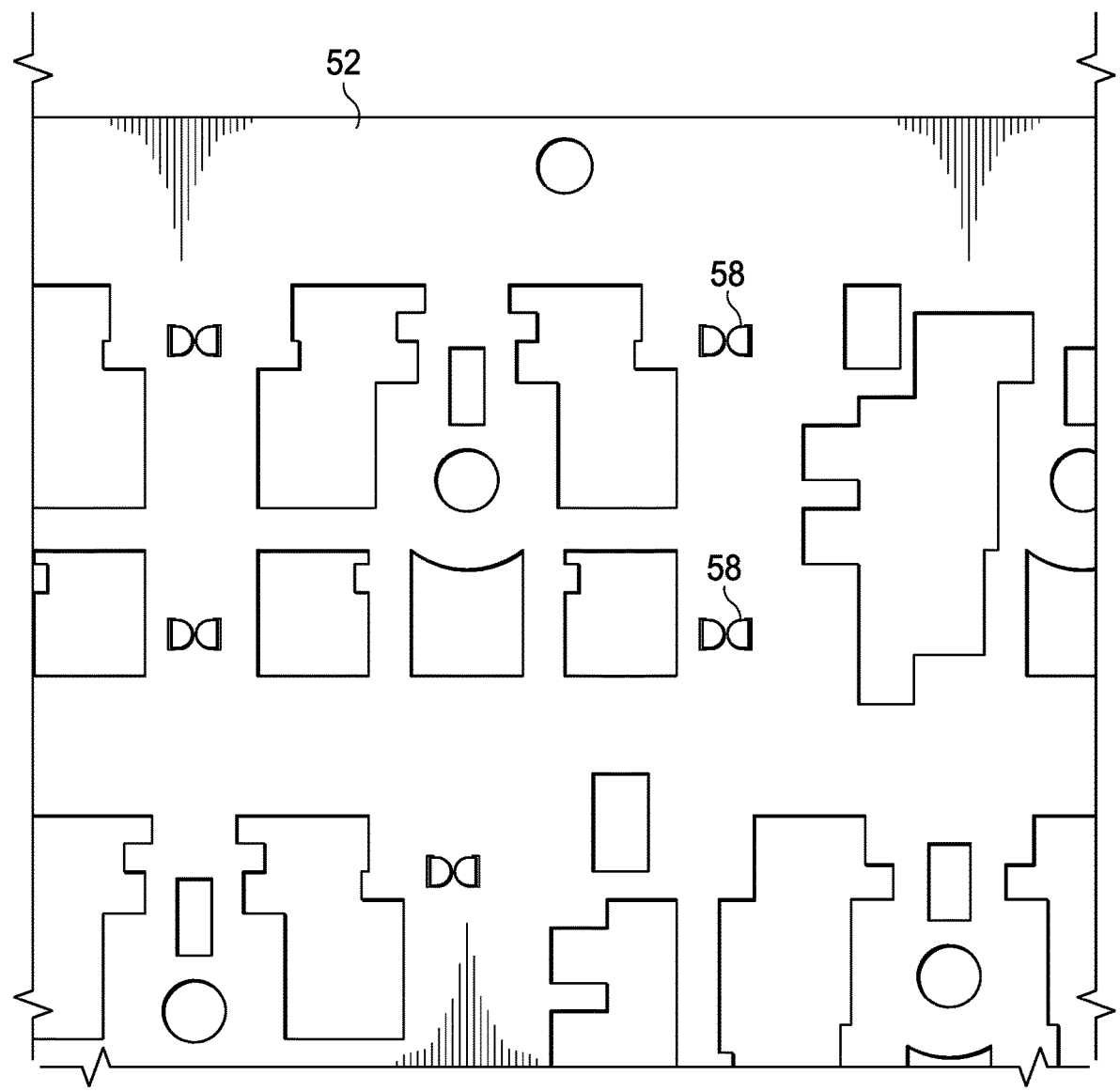
FIG. 5 depicts a support plate having tabs configured to couple with a lattice that provides structural support to the keyboard.

Referring now to FIG. 5, a support plate 52 is depicted having tabs 58 configured to couple with a lattice that provides structural support to the keyboard. For example, tabs 58 are sized to accept lines of raised material of lattice 44 to snap in place. For example, the membrane has openings that align with tabs 58 so that tabs 58 protrude through the membrane to allow the lattice lines of raised material to couple to the tabs and capture the membrane. In alternative embodiments, lattice 44 may have material that extends down and into tabs 58 or through openings of support plate 52 to couple to support plate 52, such as heat stakes or metal pins that solder or weld to support plate 52. Although the example embodiment depicts the lattice capturing the membrane over support plate 52, an alternative embodiment might couple the lattice directly to support plate 52 and place the membrane over the lattice and support plate structure. In such an embodiment, the lattice may include relief sections to accommodate wiring of the membrane.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information; and
   a keyboard coupled to the housing, the keyboard having plural keys, each key biased to an elevated plane by a biasing device and operable to accept an end user press to an input plane, at least some of the plural keys having an upper surface with adjacent perimeters and a lower surface with beveled perimeters, a lattice disposed within the beveled perimeters and hidden below the plural keys by the adjacent perimeters, a downward press on the keys provided vertical room relative to the lattice by the beveled perimeters;
   wherein the keyboard further comprises:
   a support plate; and
   a membrane disposed on the support plate and operable to detect key presses at the input plane;
   wherein the lattice is disposed between the membrane and the plural keys; and
   wherein the keyboard has a front side, keys disposed at the front side having the beveled perimeter only at inner sides and an extended face at the front side, the lattice disposed at the beveled perimeter and not at the front side.

2. The information handling system of claim 1 wherein the biasing device comprises a scissors mechanism disposed under each of the plural keys.

3. The information handling system of claim 1 wherein the lattice couples to the support plate through openings of the membrane.

4. The information handling system of claim 3 wherein the lattice couples by heat stakes to the support plate.

5. The information handling system of claim 3 wherein the lattice welds to the support plate.

6. The information handling system of claim 3 wherein the support plate integrates tabs that couple to the support plate.

7. The information handling system of claim 1 wherein the plural keys at the adjacent perimeters substantially covers the lattice.

8. A method for assembly of a keyboard, the method comprising:
- forming plural keys having a beveled perimeter at a lower surface;
- coupling a lattice to a support plate, the lattice aligning with the beveled perimeters;
- coupling the plural keys to the support plate biased to an elevated plane, each key configured to accept a press to an input plane, the beveled perimeters disposed over the lattice to align upper surface perimeters of the plural keys adjacent to each other thereby hiding the lattice from view above the plural keys;
- forming a front row of the plural keys to an extended face at a front side and the beveled perimeters at inner sides; and
- forming the lattice to have a raised surface in an interior portion and a flat surface at a front portion.

9. The method of claim 8 wherein the upper surface perimeters align with a proximity that substantially hides the lattice from view.

10. The method of claim 8 further comprising:
- coupling a membrane between the lattice and the support plate; and
- detecting key inputs with a press of the keys to the input plane.

11. The method of claim 10 wherein the coupling the membrane further comprises heat staking the lattice to the support plate.

12. The method of claim 10 wherein the coupling the membrane further comprises snapping the lattice into tabs formed in the support plate.

13. The method of claim 8 wherein the lattice is stainless steel.

14. A keyboard comprising:
- a support plate;
- a membrane disposed over the support plate and operable to detect key presses as touches pressed against the support plate;
- plural keys disposed over the membrane in an elevated plane, each key operable to press down to an input plane to touch the membrane to indicate an input, each key having a bevel feature on at least one side of the perimeter of the key bottom surface; and
- a lattice having plural openings defined by lines of material raised relative to the support plate, each opening aligned with one or more of the plural keys, the lines each aligned between adjacent keys and under the bevel feature of both of the adjacent keys, the lattice lines disposed under the bevel feature are substantially hidden when viewed from a top surface of the plural keys, a front row of the plural keys have an extended front face at the bottom surface and the bevel feature around the remainder of the bottom surface perimeter and the lattice terminates without extending under the front face.

15. The keyboard of claim 14 wherein the lattice comprises stainless steel.

* * * * *